March 3, 1964 E. R. LIEBERMAN 3,122,788
APPARATUS AND METHOD FOR PRODUCING COLLAGEN
TUBING BY CONTINUOUS EXTRUSION
Filed Jan. 16, 1961 5 Sheets-Sheet 1

INVENTOR
EMANUEL R. LIEBERMAN
BY
Morgan Finnegan Durham & Pine
ATTORNEYS:

March 3, 1964 E. R. LIEBERMAN 3,122,788
APPARATUS AND METHOD FOR PRODUCING COLLAGEN
TUBING BY CONTINUOUS EXTRUSION
Filed Jan. 16, 1961 5 Sheets-Sheet 5

INVENTOR
EMANUEL R. LIEBERMAN
BY
Morgan Finnegan Durham & Pine
ATTORNEYS:

_United States Patent Office_

3,122,788
Patented Mar. 3, 1964

3,122,788
APPARATUS AND METHOD FOR PRODUCING COLLAGEN TUBING BY CONTINUOUS EXTRUSION
Emanuel Roy Lieberman, Somerville, N.J., assignor to Johnson & Johnson, a corporation of New Jersey
Filed Jan. 16, 1961, Ser. No. 82,933
12 Claims. (Cl. 18—12)

The present invention relates to the manufacture of tubular collagen products such as synthetic sausage casings and, more particularly, to an improved apparatus and method for producing collagen tubing by continuous extrusion.

The product of the invention, after suitable finishing treatments, is particularly adapted to be utilized as an edible casing for fresh pork sausages which must be cooked by the consumer, as well as sausages of the wiener or frankfurter type. The latter sausages are processed by being smoked and cooked by the packer and are generally reheated before they are consumed. When such sausages are provided with edible casings, it is unnecessary to remove the casing before the sausage is eaten.

Natural casings produced from the intestines of sheep, hogs and cattle have certain inherent shortcomings including non-uniformity and porosity of casing wall, variations in casing size and edibility, and wide fluctuations in market price and availability. Except for some made from sheep intestines, they are tough and hard to masticate. Also, natural casings are difficult to clean and prepare for human consumption. In addition, the thickness of the wall and diameter of natural casings will vary, causing difficulty during modern high speed stuffing. In view of these deficiencies, many attempts have been made to produce better edible synthetic casings from protein sources such as collagen.

The present invention provides a new and useful extruder and a method of extrusion by which tubing is produced from animal collagen in a form from which synthetic casings of adequate strength can be produced but which possess unusual tenderness in eating as well as the ability to resist melting and shrinking or bursting during cooking.

_Definitions_

For the sake of clarity and brevity, certain terms hereinafter used in the specification and claims, which will be useful in understanding the invention, are defined as follows:

By the term "collagen fibril" is meant the structural unit of collagenous tissues made up of many thousands or even millions of tropocollagen units. The collagen fibril, as it is found in cowhide, measures in the completely dehydrated state about 50 to 1,000 Angstroms in diameter and is of indefinite length. Cowhide collagen fibrils measuring 20,000,000 Angstroms (two millimeters) in length have been observed. The collagen fibrils in bovine hide are arranged in bundles to form collagen fibers measuring many thousands of Angstroms in diameter and of indefinite length.

Cowhide collagen "fibers" (as distinguished from fibrils) have been observed which measure about 10,000 to 20,000 Angstroms in the dehydrated state, and larger collagen fibers measuring as much as one millimeter (10,000,000 Angstroms) in diameter in their dehydrated state are believed to exist. Each collagen fiber contains hundreds or even thousands of fibrils, all bound together by a sheath. The collagen fibers, in turn, are organized into bundles of collagen fibers that are large enough to be seen by the naked eye and form the familiar fibrous network visible in hides of all sorts.

The term "swollen collagen fibril" in the context of this application is the state assumed by collagen fibrils after fragments of cowhide or the like have been progressively reduced in size and the fibrils therein are swollen to more than 100 times their original volume in a sufficient quantity of a weak acid solution. The pressure of the swelling of the constituent fibrils will rupture the relatively inelastic fiber sheath that surrounds the fibrils, thus destroying the identity of the fiber. The swollen collagen fibrils may then be separated from remnants of the fiber sheath by filtration. It must be emphasized, however, that to achieve disruption of the fiber structure by swelling, the ratio of swelling fluid to collagen must be high.

The term "fluid mass of swollen collagen fibrils" is herein applied to such a mass after filtration and when ready for extrusion. In that state, the separated fiber sheaths have been removed. In accordance with the present invention, such a fluid mass of swollen collagen fibrils should contain from about 2.5% to about 6% of collagenous tissue on a dry-weight basis.

Typical casings produced from tubing extruded in accordance with the present invention have the following illustrative properties when tested on an Instron tensile tester by the method described in copending application Serial No. 82,935, filed as of even date herewith. Each casing sample is heated to 99° C. with live steam prior to testing.

The change of length due to shrinkage of a three-inch sample of the casing heated to 99° C., with live steam amounts to from about 1.0 inch to about 2.0 inches.

The strain in inches per pound of stress is from about 2.0 to about 20.0 inch pounds.

The hot tensile strength is from about 0.10 pound to about 1.00 pound.

The shrink tension is from about 0.08 pound to about 0.50 pound.

The percentage recovery (length of the casing at the break point) divided by original length of sample being tested times 100, amounts to from about 81 to about 150.

The burst strength is at least about 10 to 28 pounds per square inch. "Burst strength" is the air pressure in pounds per square inch required to burst dry extruded collagen casing having a wall thickness of one mil. The values of "burst strength" expressed in this specification were determined on a Perkins Mullen Tester (Model C). Fluid under uniformly increasing pressures expands against a distensible rubber diaphragm and, simultaneously, into a Bourdon pressure gauge. The material to be tested is clamped securely to a metal plate through which the diaphragm is free to expand through a circular opening against one square inch of its surface. As the sample distorts under pressure, the diaphragm assumes the exact contour of the material.

_General Description_

Natural casings are formed of a network of generally evenly distributed interlaced collagen fibers and fiber bundles and thus inherently possess the necessary strength characteristics, while those from the optimum sheep gut product are also edible when cooked. However, synthetic collagen casings heretofore available have not been able to satisfactorily duplicate the natural product, particularly as to tenderness and cooking responses. It has heretofore been proposed to produce an artificial collagen casing from fibrous animal material such as, for example, dehaired hide which has been subjected to conventional liming treatments. Collagen in such limed fibrous material is converted by mechanical disintegration and the swelling action of acids into a paste of fiber bundles and fibers which is then extruded to form a tube. Such paste or pasty masses commonly have a solids content of the order of 10% to 25%, although in some cases the solids have been as low as about 8%. These pastes are extruded under relatively great pressures of the order of hundreds of atmospheres, required because of the highly viscous nature of the relatively dry pasty masses. The tubes so produced are relatively thick, tough and difficult to masticate after cooking.

These undesirable properties of prior artificial collagen casings are further increased and complicated by the types of treatments to which the tubes are commonly subjected after extrusion. Such casings, when stuffed with edible meat, will not survive in the frying pan because cooking temperatures cause the collagen casing to shrink, extruding the meat product.

In accordance with the present invention, it has been discovered that an exceedingly thin-walled tube of collagen casing material may be produced from a fluid mass of swollen collagen fibrils having a solids content much lower than heretofore used, i.e., on the order of at least 2.5% and less than 6%, preferably about 3.5% to 5%. It has been observed that collagen fibrils in unlimed cowhide will swell to more than 100 times their original volume if comminuted cowhide, progressively reduced in particle size to very small dimensions, is placed in a sufficient quantity of a weak acid solution, such as 1.2% of lactic acid in water. The pressure of the swelling of the constituent fibrils will rupture the relatively inelastic fiber sheath that surorunds the fiber containing the fibrils, thus destroying the identity of the fiber. The swollen collagen fibrils may then be separated from remnants of the fiber sheath by filtration. Thin-walled tubular casing material formed by extrusion in accordance with the present invention from such a relatively watery mass of exceedingly fine swollen fibrils, when subjected to suitable post-extrusion treatments, will produce sausage casings which are very tender and so easy to masticate that in eating, they can scarcely be distinguished from the sausage meat itself. Nevertheless, sausage casings prepared in accordance with the present invention possess sufficient tensile strength and burst strength that they may be shirred, stuffed and linked in commercial practice without rupture or undue stretching. Moreover, such casings have been found to survive the stresses and temperatures involved in cooking in the frying pan so that there is substantially no shrinkage, rupturing or melting of the casing or extrusion of the meat product therefrom during the cooking process.

However, the utilization of fluid masses of swollen collagen fibrils (i.e., those in which the collagen material has been reduced to particles of fibrillar size and in which the proportion of collagen solids in the swollen fibrillar mass is of the low order above-described) introduces problems in extruding and in handling the extruded tubular body from the moment it leaves the orifice of the extruder until it has been dried and reduced to the ultimate size in which it is to be shirred and later used. The delicate nature of the swollen collagen fibrils is such that the fluid mass thereof must be handled carefully during the extrusion process itself to avoid degradation of the material as well as undesirable layering and the formation of weak spots in the final product.

While the preferred percentages of collagen solids heretofore given for practice of the invention are not highly critical to the first decimal point, the extrusion and post-extrusion handling of fluid masses of swollen collagen fibrils below about 2.5% of collagen solids is impractical. Although extrusion of such a mass having a solids content of between 2% and 2.5% is theoretically possible, the watery nature thereof reduces the visco-elastic properties of the mass and introduces post-extrusion problems of handling and so increases the time required for coagulation that its use is quite impracticable.

On the other hand, a fluid mass of swollen collagen fibrils having a collagen solids content of about 4% is optimum for extrusion, and 5% and up to 6% are practicable. Above 6%, however, the viscosity of the mass is so great that undue power is required for extrusion and heating and other problems arise because of friction. Also, the post-extrusion processing of the extruded tubular body requires special handling. It will further be understood, as more fully described in copending application Serial No. 82,934, filed as of even date herewith, that within the above-described preferred and practicable ranges of collagen solids, the extrusion of such a watery or low-solids material produces an exceedingly fragile tubular body which must be handled with the greatest delicacy and care during the subsequent treatments in which it is coagulated, hardened, plasticized and dried.

In the practice of the invention, when the mass of swollen collagen solids leaves the extruder orifice, it is essentially a liquid which must be immediately given a coagulating treatment in order to preserve the shape imparted to the liquid as it leaves the mouth of the extruder and is still travelling under the kinetic energy imparted by the extrusion force. Once this initial coagulation takes place, the extruded tubular body possesses tangible form and integrity of its own but nevertheless remains weak, fragile and subject to rupture as it passes in the wet state through subsequent conditioning treatments. In spite of its fragile nature, the exacting requirements of continuous production are such that this initially watery tubular body must be reduced from an initial wall thickness at the extruder orifice of, e.g., about 14 mils to an ultimate wall thickness of about one mil while preserving the interior diameter imparted to it at the extruder orifice.

In prior extruder devices used with the plastic fibrous collagen masses described, the pasty mass is fed directly into an elongated annular extrusion passage and extruded therefrom under the great pressures required without appreciable mixing or homogenization of the collagenous material during extrusion. A major cause of weak spots in extruded collagen casings is the tendency of both the collagen fiber bundles, fibers and even fibrils to mat or gather and become oriented in the direction of collagen flow when they encounter an obstacle in their path of travel during extrusion. These obstacles usually include a collagen agglomerate in the plastic mass which is retained or caught in the narrow opening of the extrusion chamber. Heretofore, because the basic collagen structure, composed of fibers and fiber bundles, was of a much larger size order than swollen fibrils, and because there was no appreciable homogenization during extrusion, casings often were produced with a generally longitudinal seam or fault in the casing wall formed by collagen fibers matted or gathered by a blocked extruder. This fault or seam materially reduced the strength of such casing.

Further, swollen collagen fibers and fiber bundles readily tend to become oriented in the general direction of extrusion or in other directions as determined by the extruder construction. Orientation in a particular direction throughout a substantial part of the thickness of a casing makes the casing readily susceptible to splits or tearing in the direction of orientation, the tear line occurring generally in the area between the oriented collagen fibers. Attempts have been made to improve the tear strength by randomly orienting the fibers by a tangling, matting or felting action, but such haphazard arrangements of fibers so produced have not resulted in a satisfactory product.

A phenomenon inherent in fluid masses of swollen collagen material, either fibrous or fibrillar, creates an important and difficult problem in the formation of articles produced by extrusion thereof. When such a fluid collagen mass undergoes conditions of flow, it is affected in such a manner that it "remembers" the boundary conditions under which it has been flowed. When two such fluid masses, so preconditioned, are brought into contact with each other, the boundary area defined by their contacting surfaces persists in the fluid mass and persists even in forms into which such mass is subsequently extruded or otherwise shaped. The formation and persistence of such boundary areas in articles extruded from collagen masses in which they exist, creates areas of weakness which permanently weaken the product so formed.

Thus if a fluid mass of swollen collagen fibrils is caused to flow into an annular cavity from a peripheral inlet, the flowing mass is divided and then the divided streams flow together somewhere in their annular paths. The area where the divided streams meet and merge remains in the "memory" of the material as a persistent boundary area and becomes, in use, an area of weakness. This weak boundary area will persist in the subsequent handling of the material unless and until the fluid mass is so thoroughly blended at the boundary area that such area is obliterated.

The present invention overcomes or avoids this boundary area problem by applying continuous and intensive rotary shearing forces to the mass of material to be extruded throughout its passage through the extruder. By this means the prior "memory" of the boundary area is obliterated and no boundary effect is permitted to occur during the extrusion process. The fluid material is never divided into streams or separate flows having boundaries which meet each other in the extrusion process, but always travels in complete circular paths both radially outwardly and inwardly during its movement through the extruder.

In practice, sausage casings are subjected to tension or pull in a direction parallel to the longitudinal axis of the casing tube during the manufacturing steps of drying, shirring and linking. In addition, upon stuffing and cooking of the meat emulsion therein, the casing is subjected to internal bursting pressures. A satisfactory casing should possess sufficiently high and uniform strength characteristics to resist these forces, while not being tough, thick or otherwise difficult to chew.

The strength of a casing made from swollen collagen fibrils apparently is derived from the collagen fibrils constituting such casing. The weakest section of any such collagen casing generally is believed to be the area between the individual collagen fibrils after they have been swollen and dried in situ. Thus an important factor affecting the strength of a casing is the collagen fibril distribution therethrough. Uniform or homogeneous distribution of the collagen fibrils, particularly in random orientation throughout the casing wall, eliminates the development of weak spots in the casing wall due to the absence of sufficient fibrils at the weakened location. The appearance and internal microscopic structure of casing material having these properties are more fully disclosed and claimed in application Serial No. 82,935, filed as of even date herewith.

Objects

It is therefore an object of this invention to provide a novel extruder mechanism which produces a collagen casing tubing formed of swollen fibrils having improved strength characteristics.

It is a further object of this invention to provide a novel extruder apparatus for continuously extruding from a fluid mass of swollen collagen fibrils, tubing for collagen casings having a generally uniform collagen fibril distribution therethrough.

Another object of the invention is to provide a new and useful extruder method and means for avoiding the occurrence of boundary areas, such as referred to above, in the fluid mass of swollen collagen fibrils and to obliterate any such boundary areas which may have been formed in said mass prior to its having been passed into and through the extruder.

Another object of the invention is to provide extruder mechanism for continuously extruding a collagen tubing from a fluid mass of swollen collagen fibrils wherein the extruder elements impart a transverse rotary shearing action to the fluid mass during the extrusion process to eliminate any boundary effect in the collagen mass.

It is also an object of the invention to provide a novel method of extruding a continuous tube of collagen from a fluid mass of swollen collagen fibrils by subjecting the fluid mass to transverse rotary shearing actions to eliminate boundary effects in the collagen mass and flowing the fluid mass in continuous circular paths during the extrusion process.

The foregoing and other objects may be attained in accordance with the present invention which, in its various aspects, includes a novel apparatus for the manufacture of a synthetic collagen casing and novel steps in the manufacture of such product.

Referring now in detail to present preferred practices by which the fluid mass of swollen collagen fibrils is prepared for extrusion in accordance with the invention, said preferred method utilizes as the raw material fresh (frozen or salted) dehaired hides, preferably bovine, which have not been treated with lime or other alkaline agents or with enzymes. Representative examples illustrating the preparation of such preferred mass of swollen collagen fibrils are disclosed in copending application Serial No. 64,664, filed October 24, 1960. That application also generally discloses, primarily in a chemical sense, the other treatment steps to which the extruded tubular body of swollen collagen fibrils is subjected in carrying out the method steps embodying the present invention. Parts taken from Example I of that application are set forth below for the purpose of illustrating and explaining the various method and physical treatment steps employed in the present invention, but the invention is not limited to such example, as will be clear to those skilled in the art.

In said example, fresh steer hides are washed with cold water at 13° C. or less in a rotating drum for 10 to 24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand and composites are prepared from five hides. The hide composites are then cut into one-half to four square inch sections and reduced to pulp by three passes through a meat grinder, each pass being a finer grind. The first and second passes are through 18 and 8 millimeter holes, respectively. The final grind is through holes 1.5 millimeters in diameter. It is important during the grinding process to keep the pulp below 20° C. This may be done by adding crushed ice to the hide sections as they are fed to the grinder.

The ground pulp is next diluted with tap water at 16° C. to give a smooth slurry containing 7.4% dry solids. This slurry (125 parts) is then treated with 125 parts of a 2.4% lactic acid water solution using an inline mixer such as that manufactured by Cherry Burell (Model 24) to form a homogeneous mass of swollen collagen fibrils. It is important during this acid swelling step also that the temperature be maintained below about 25° C. The mixture so obtained contains 3.7% hide solids and 1.2% lactic acid. After the pump is blended with acid, the mass of swollen collagen fibrils is further dispersed in a suitable homogenizer such as a Manton-Gaulin homogenizer (Model 125–K–5BS), fitted with a two-stage valve and operated with a 1,500 p.s.i. drop per stage. In the ultimate fluid mass of swollen collagen fibrils so prepared, the individual fibrils are freed from the fiber bundles and fibers and released from the fiber sheaths. They take up all liquid and swell from an original diameter of the order of 300 A. to 1,000 A. to a freshly swollen (one day old) maximum diameter of the order of 15,000 A.

The fluid mass of swollen collagen fibrils obtained by the foregoing method (which is given by way of illustration and without specific limitation) is then filtered through a seven-mil filter screen to remove unswollen collagen and non-collagenous materials, after which it is ready for extrusion.

In accordance with the invention, the desired distribution of the collagen fibrils in the casing wall is effected by the use of improved extruder mechanism which utilizes passageways between planar elements which are relatively rotatable about a central axis extending in the general direction of extrusion, preferably vertically. The inner planar element is preferably disc-like, of a diameter substantially greater than its axial depth and having a planar upper surface generally perpendicular to the direction of extrusion. The upper surface of the inner element or disc is in adjacent spaced relationship with a cooperating planar face of the outer element, forming an upper flat, thin extrusion passageway therebetween communicating with an annular discharge chamber at the center of the disc which extends parallel to the general direction of extrusion.

A fluid mass of swollen collagen fibrils is pressure-fed in the general direction of extrusion and directed against the underface of the inner extruder element or disc into the space between the inner and outer elements. The feed pressure directs the fluid mass radially outwardly through the relatively deep lower passageway toward the periphery of the disc where it passes around the circumferential edge of the disc into the upper planar extrusion passage, which is preferably shallower than the first or lower passage.

In said upper extrusion passage, the continued rotational movement of the extruder member or members creates a circular tension in the fluid mass of swollen collagen fibrils which exhibits visco-elastic properties. A visco-elastic material is one having both elastic and viscous properties; that is to say, although the material be viscous, it possesses a certain elasticity of shape. By subjecting a visco-elastic material to rotational forces, a circular tension is created therein which contracts the material radially toward the center of rotation, rather than outwardly as is normally the case with other kinds of fluids, e.g., water. This phenomenon is called the "Weissenberg effect." The circular tension thus created in the visco-elastic mass of swollen collagen fibrils urges the collagen mass radially inwardly from the periphery of the disc along the upper extrusion passage toward the central annular discharge chamber whence it is extruded in the form of a tube into a dehydrating or coagulating bath.

Thus the novel extruder apparatus of the present invention utilizes the visco-elastic property of the swollen fibrillar fluid mass to substantially reduce extrusion pressures. Further, by subjecting the collagen mass to smooth shearing action by the extruder elements in a direction transverse to the general direction of extrusion, any matted or gathered collagen agglomerates are dispersed, effecting an even distribution of individual collagen fibrils in the fluid fibrillar mass entering the discharge chamber.

The desired distribution of the swollen collagen fibrils is attained by subjecting substantially all of said fibrils in the narrow extrusion passages to transverse, smoothly-applied, rotational forces acting in spaced planes parallel to the radial extrusion forces. By subjecting the fibrils to parallel planar forces, it is believed that a parallel planar distribution of fibrils is produced while the rotational shearing forces effect a random orientation of the fibrils within such parallel planes, although applicant does not intend to be limited to this theory of operation as expressed here or elsewhere in his application. Concomitantly, the fluid fibrillar mass is protected from disruption by grinding, turbulence and disruptive contacts as it passes through the smooth planar passages in the extruder.

By the process of the present invention, a collagen tube is extruded by flowing a fluid, visco-elastic mass of swollen collagen fibrils upwardly under pressure through a smooth inner annular zone concentric about a longitudinal axis extending in the general direction of extrusion, directing the flow of swollen fibrils during a portion of its travel through the annular zone smoothly radially outwardly from and then smoothly radially inwardly (under the circular tension forces of the Weissenberg effect) into the annular exit zone. This is done through interconnected, spaced planar zones extending laterally of the general direction of extrusion, and subjecting the swollen collagen fibrils in the planar zones to shearing forces transverse to the general direction of extrusion to uniformly distribute the collagen fibrils in the mass re-entering the annular zone.

It is to be understood that both the foregoing general description and the following detailed description are exemplary and explanatory but are not restrictive of the invention.

For a more complete understanding of the invention, reference should be had to the accompanying drawings, wherein.

Figure 4:
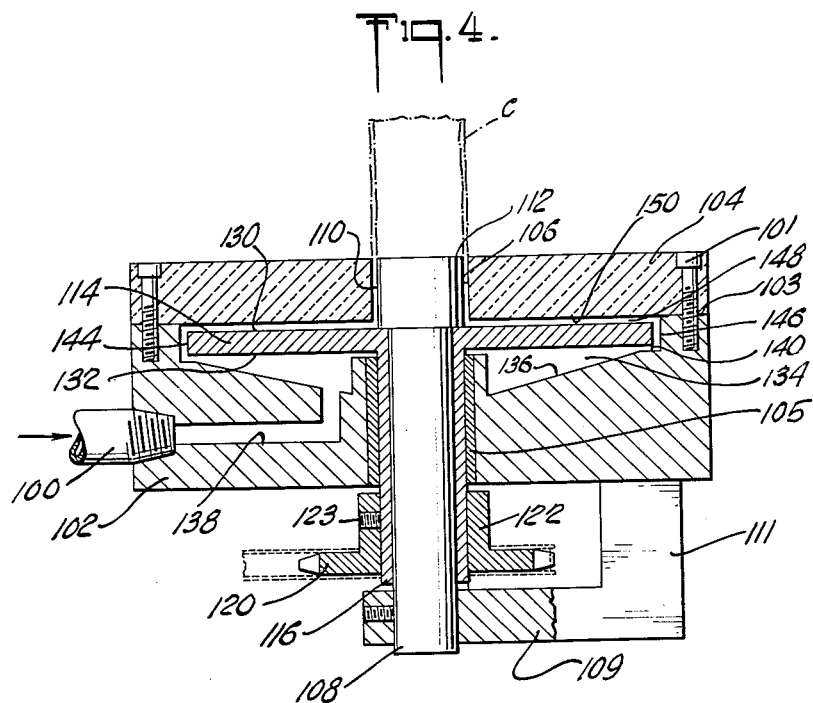
FIG. 4 is a vertical sectional view, similar to FIG. 1, of a fourth embodiment of the present invention.

Referring now in detail to the preferred embodiments of the invention shown by way of example in the accompanying drawings, FIG. 4 shows in somewhat diagrammatic form a structure capable of carrying out the underlying principles of the invention in a relatively simple manner. In this form, the homogenization and distribution of the collagen fibrils are accomplished by means of a single rotating disc element.

As shown, the extruder of FIG. 4 comprises tube or conduit 100 through which the fluid mass of swollen collagen fibrils is introduced under suitable hydraulic pressure into the interior of the extruder. The extruder construction comprises a cylindrical housing 102 which is centrally apertured to provide a cylindrical vertical passageway 105 therethrough.

Axially disposed in housing 102 is a hollow mandrel 108. The lower end of the mandrel passes through a base 109 and is secured to a bracket 111 carried by suitable framework (not shown) which supports the extruder in vertical position.

Housing 102 is covered by a flat cylindrical cap 104 which is fixed to the upper flat face 103 of housing 102 by means of countersunk bolts 101. Cap 104 is also centrally apertured at 106 to provide the mouth or central opening for the extruder from which the extruded tubular body C is fragmentarily shown, rising vertically from the extruder orifice.

The annular extruder orifice 110 is formed between the aperture 106 in cap 104 and mandrel 108.

For this purpose, mandrel 108 has an upper flange section 112 extending through opening 106 in cap 104. Mandrel 108 is co-terminous with the upper face of cap 104 and is spaced from the periphery of recess 106 to form the annular, vertical discharge chamber or passageway and orifice 110 therebetween for the upward extrusion of the tubular body C.

In accordance with the invention, means are provided for subjecting the flowing mass of swollen collagen fibrils to the shearing action of a rotating planar disc prior to the extrusion through the orifice 110. Preferably, in accordance with the invention, this rotating disc is located so that the fluid mass will be caused to travel in contact with its rotating lower surface, thence around the perimeter of the rotating disc and across its upper surface through passageways defined between the rotating lower and upper faces of said disc, and planar surfaces lying above and below said disc. As shown, the disc 114, which is relatively thin and of wide diameter, is mounted to rotate about the central axis of the extruder, being formed as a head or flange on the tubular drive shaft 116 which extends downwardly from the lower face of the disc through the central aperture in block 102 beyond the lower end thereof. The downwardly projecting end of shaft 116 is provided with an externally mounted ring gear 120 which is adapted to be driven by any suitable gearing and drive source, not shown. The gear 120 is formed as part of a sleeve 122 which embraces the lower end of shaft 116 and is fixed thereto as by the setscrew 123.

As appears from the drawings, the disc 14 is of a relatively wide diameter and shallow depth. Its upper surface 130 and its lower surface 132 are both flat planar surfaces extending substantially the total diameter of the disc beyond the central drive shaft or shell 116.

In accordance with the invention, means are provided for causing the fluid mass of swollen collagen fibrils to travel smoothly under pressure in a mixing chamber from near the inner or central portion of the lower face 132 of disc 114 in a radially outward path across the bottom face of the disc where the material in the mass is subjected to a rotary shearing action as described above. Also, this first or lowermost passageway is designed to decrease in depth outwardly toward the perimeter of the disc so that the shearing action between the bottom of the rotating disc and the opposing planar face of the member 102 is increased in intensity as the material travels across the bottom of the disc. For this purpose, the upper interior surface of the housing 102 is formed with as a cylindrical chamber or cup 134 underlying the major part of the bottom surface 132 of disc 114. The bottom planar surface 136 of chamber 134 is, as shown, inclined downwardly and centrally so as to provide a planar surface below the disc of essentially triangular cross-section, with the deeper zone thereof adjacent the central portion of the extruder.

As will be seen in the lefthand portion of FIG. 4, means are provided for feeding the fluid mass centrally of the mixing chamber 134 from the inlet conduit 100. For this purpose, a bore 138 communicates with the inner threaded end of conduit 100 and leads inwardly and thence upwardly to feed the material adjacent the deeper end or portion of the chamber 134. While only one such inlet is shown, a plurality thereof may be provided to feed the material at different spaced points around and adjacent to the inner lower portion of chamber 134.

Preferably, the planar inclined surface 136 extends upwardly and outwardly to near the perimeter of disc 114 but is flattened there to form the horizontal annular surface 140. The terminal portion of the lowermost planar passageway is horizontal In accordance with the invention, the fluid material is caused to travel vertically upwardly when it reaches the perimeter of the rotating disc and thence to travel radially inwardly across the top of the rotating disc until it reaches the extrusion orifice 110. For this purpose, a vertical passageway 144 is provided between the perimeter of the vertical edge of rotating disc 114 and cooperating edge 146 formed in the block 102. A relatively narrow flat horizontal passageway 148 is provided between the top of the flat rotating disc 130 and the lower flat horizontal face 150 of the upper block member 104 for the inwardly radial, visco-elastic travel of the fluid material. This passageway 148 communicates at the inner or central part thereof with the vertical extrusion chamber and orifice 110.

In accordance with the invention, and as described more fully in connection with FIG. 1 hereinafter, means are provided for subjecting the extruding tubular body C to a coagulating treatment as soon as it emerges from the extrusion orifice. For this purpose, both the interior wall and the exterior wall of the rising tubular body are immersed in rising columns of coagulating liquid as soon as the tubular body emerges from the extrusion orifice. For providing the interior column of said liquid, the central opening of the hollow mandrel 108 is employed.

Figure 5:
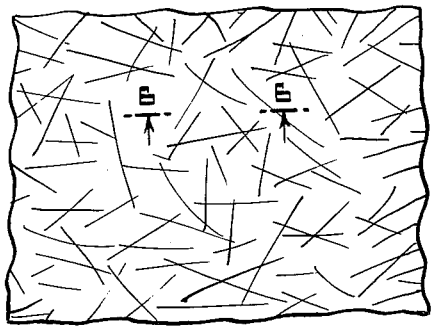
FIG. 5 is a greatly enlarged diagrammatic plan view of the wall of an extruded tubular body illustrating the random distribution of the collagen fibrils believed to occur.
Figure 6:
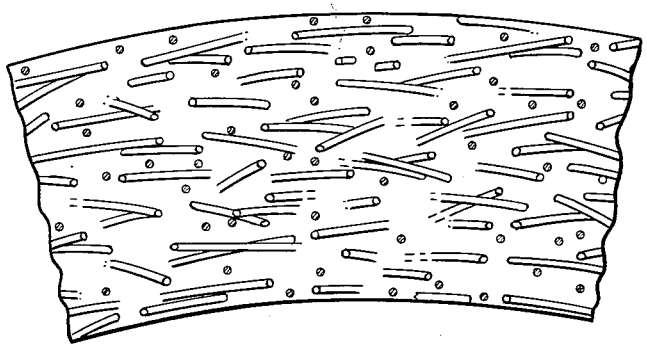
FIG. 6 is a cross-sectional view of the wall shown in FIG. 5, taken along line 6—6 of FIG. 5.

The casing tubing produced by the extruder of FIG. 4 (as well as those hereinafter described) is generally uniform and homogeneous. From microscopic examination it appears that the collagen fibrils constituting the casing wall are randomly oriented but lying parallel to the curved planes forming the surface of the tubular casing wall. FIGS. 5 and 6 are enlarged schematic views of this arrangement of collagen fibrils as they appear to exist in the freshly extruded casing wall before drying.

This arrangement is apparently accomplished by the rotating disc faces cooperating with the opposed planar faces defining the upper and lower mixing passageways. As discussed above, substantially all of the collagen mass in said passageways, especially in the upper one, is influenced by one or the other of the planar faces of the disc and/or the opposed faces of the housing. Normally, collagen fibrils tend to be oriented in the direction of extrusion. With the faces 130 and 150, for example, imparting opposite transverse shearing actions to the top and bottom portions of the collagen mass which is moving radially inwardly through upper passage 148, the collagen fibrils therein are subjected to a combination of forces. However, these rotational shearing forces are generally in planes parallel to the linear extrusion force. Therefore, the collagen fibrils appear to become disposed parallel to the planar faces of the passageway. This apparent random but parallel disposition is believed to be retained as the fibrils move through the relatively short discharge vertical chamber 110 and are extruded in the form of a tubular collagen casing having the collagen fibrils thereof randomly oriented but lying parallel to the surface of the tubular casing wall. Those fibrils in the zones nearest the vertical cylindrical walls of the chamber 110 may orient themselves somewhat longitudinally, thereby adding to the longitudinal tensile strength of the final casing.

Figure 1:
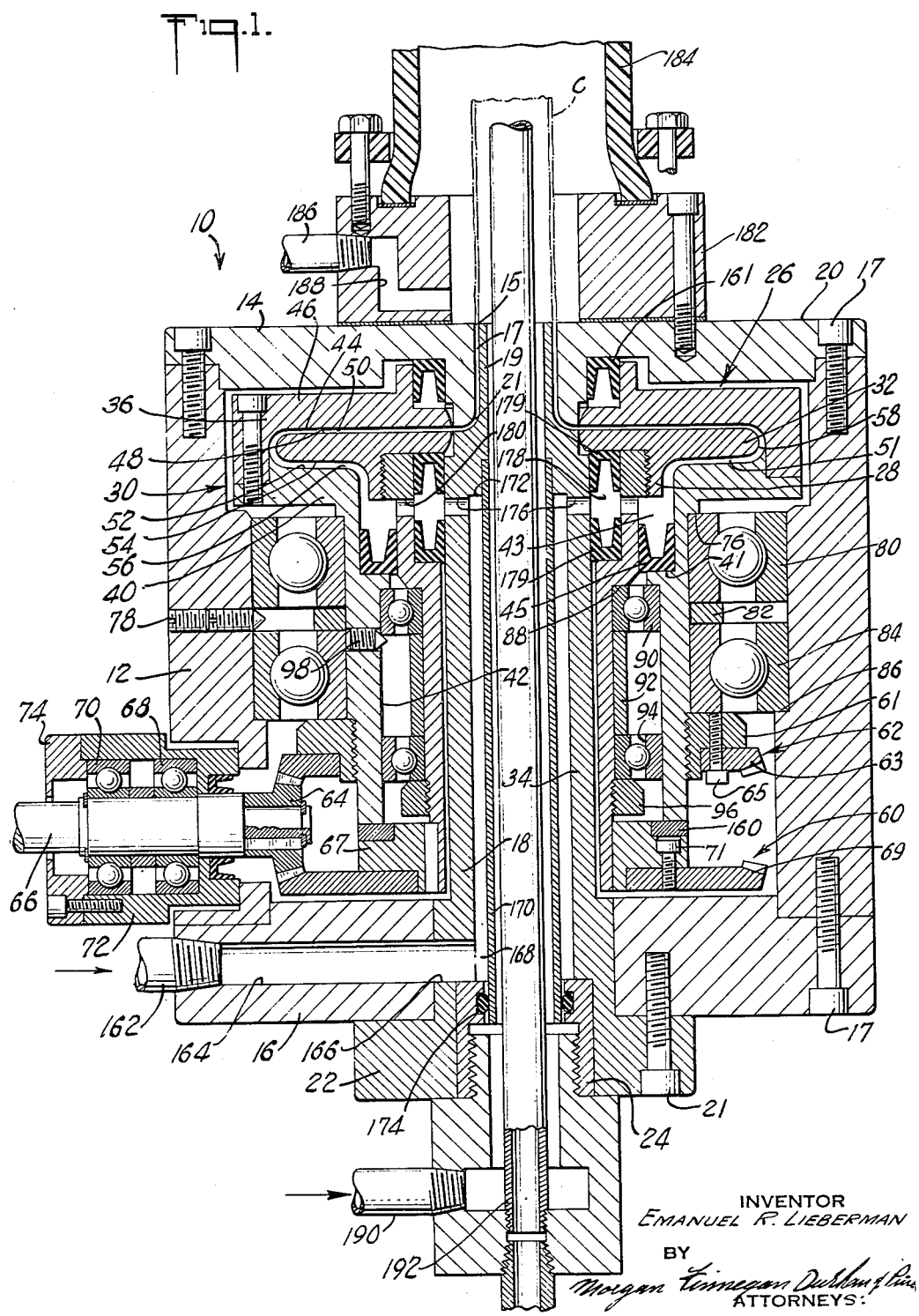
FIG. 1 is a vertical sectional view of one embodiment of the present invention.

Referring now to the embodiment represented by FIG. 1, the extruder assembly 10 is there shown in considerably greater detail. In comparison with the rather simple and diagrammatic showing of FIG. 4 with a rotating disc between stationary planar surfaces, the extruder of FIG. 1 provides planar surfaces on either side of a rotating disc which surfaces themselves rotate in direction opposite to that of the disc, thereby increasing the rotary planar forces imparted to the fluid fibrillar mass being extruded. Assembly 10 is preferably mounted for vertical delivery to extrude the watery mass of collagen fibrils in the form of a tubular body into a recirculating dehydrating or coagulating bath which flows axially in contact with both the inner and outer walls of the tubular body. By the coagulating and subsequent treatments the tubular body is ultimately reduced in wall thickness from a tube having a wall thickness of, e.g., 14 mils, to a very thin dry tube having a wall thickness of the order of 1 mil, as described in greater detail in copending application, Serial No. 82,934, filed as of even date herewith.

Extruder assembly 10 comprises a generally cylindrical, stationary housing 12 to which is fixed a top cap section 14 and a bottom section 16 by means of bolts 17. Sections 14 and 16 enclose the ends of housing 12, and suitable framework (not shown) fixed to housing 12 supports extruder 10 in vertical position.

The main central support for the moving parts of the extruder is provided by a hollow mandrel 18 co-axially fixed in the housing 12 in spaced relationship thereto. The mandrel has an upper stepped section 19 which extends through an accommodating central recess 15 in the cap 14 and is co-terminous with the upper surface 20 of the cap. The outer cylindrical surface of section 19 is spaced from the periphery of recess 15 while the step 13 proper is curved and spaced from the complementary underface of cap 14 to form a stationary discharge passage 17 comprised of a longitudinal annular section 21 interconnecting with a lateral planar section 23.

The lower end of mandrel 18 passes through a suitable central opening in bottom 16 and is provided with a terminal flange section 22 which bears against the overlying face of bottom 16 and is secured thereagainst by bolts 12, only one of which is shown. To facilitate assembly of extruder 10 in operative position as shown, mandrel 18 is recessed at its lower end to accommodate a threaded hollow insert 24.

In accordance with the invention, the mass of swollen collagen fibrils to be extruded is caused to pass between the relatively rotating planar faces of two rotatable disc members. As embodied, a pair of nested, spaced, concentrically disposed, inner and outer disc members 28 and 30 are mounted for rotation relative to each other, preferably counter-directionally, about the central axis of the extruder. The innermost disc member 28 includes a flat, disc-like upper section 32 fixed to and extending laterally from a tubular drive shaft 34 which surrounds mandrel 18. The outermost disc member 30 is bifurcated to embrace inner disc 28, being formed with an upper horizontal disc member 36 secured to a lower horizontal disc member 40 formed on the upper end of an outer, concentric, vertical tubular drive shaft 42.

Disc member 30 has a generally planar underface 44 on the base portion 46 which extends inwardly from section 36. Underface 44 extends parallel to and in adjacent spaced relation with the upper face 48 of disc section 32 to define an uppermost, generally planar relatively narrow extrusion passage 50 therebetween which is smooth and uninterrupted. A lowermost, generally planar mixing chamber 51 is also formed between the upper face 52 of disc 40 and the underface 54 of interior disc 32. Chamber 51, which is somewhat deeper than extrusion passage 50, interconnects therewith around the circumferential edge 58 of disc 32 to form a smooth continuous path for the fluid mass across passage 50 to discharge chamber 17. For distributing fibrillar collagen fluid to said chamber and passageways, the upper inner surface of shaft 42 is formed with an annular shoulder 41 which extends inwardly adjacent the outer peripheral wall of shaft 34, defining the lower end of an annular distributing chamber 43 between shafts 42 and 34. The upper end of passage 43 communicates with chamber 51, as shown. An annular sealing ring 45 seals the lower end of chamber 43 to prevent contamination of the collagen mass therein.

Drive shafts 34 and 42 are concentrically disposed in co-axial spaced relationship in housing 12, as shown in FIG. 1, with inner drive shaft 34 positioned adjacent mandrel 18 and outer drive shaft 42 radially displaced outwardly therefrom.

To rotate drive shafts 34 and 42, they are each provided at their lower ends with bevel gear assemblies 60 and 62, respectively. Gear assembly 62 includes a lock nut 61 threaded on the outer face of shaft 42 with bevel gear 63 fixed to lock nut 61 by bolts 65. Gear assembly 60 comprises a gear hub 67 threaded on the outer face of shaft 34, with bevel gear 69 secured to gear hub 67 by bolts 71. The bevels of gears 63 and 69 are oppositely disposed for engagement by a common pinion 64. Rotation of pinion 64 rotates shafts 34 and 42 and, consequently, disc members 28 and 30 in opposite directions.

Pinion 64 is fixed on one end of a shaft 66 journalled in spaced bearings 68 and 70 mounted in a bearing housing 72 recessed into the wall of housing 12. Cap 74 circling shaft 66 closes bearing housing 72 and is readily removable to provide access to the bearing when necessary. Shaft 66 is driven by a suitable power source such as a motor and gearing (not shown) to effect opposite rotation of members 28 and 30.

Drive shafts 42 and 34 are held in spaced radial and axial alignment in housing 12 as follows:

The outer periphery of shaft 42 adjacent lip 40 has a shoulder 76 formed thereon which rests on the inner race of a bearing 80 located between the outer periphery of shaft 42 and the inner periphery of housing 12. The inner race of bearing 80, in turn, is supported on a washer 82, seated on the inner race of a second bearing 84, the outer race of which rests on an anular shelf 86 formed on the inner periphery of housing 12. The inner race of bearing 84 rests on the upper face of lock nut 61 which maintains the assembly in fixed axial position. Set screw 78 threaded for travel in the wall of housing 12 is operative to support the outer race of bearing 80 and to maintain bearings 80 and 84 in spaced alignment between housing 12 and shaft 42.

The upper end of shaft 34 is radially offset outwardly adjacent shoulder 41, forming an annular ridge 88 on the outer periphery thereof. Ridge 88 rests on the inner race of a bearing 90, in turn supported on a sleeve 92 seated on a second bearing 94 between shafts 42 and 34. The outer race of bearing 90 supports the underface of shoulder 41. A lock nut 96 threaded on the outer periphery of shaft 34 supports bearing 94 and maintains the entire assembly in axial position between shafts 42 and 34. Set screw 98 threaded for travel in the wall of shaft 42 is operative to support the outer race of bearing 90 and maintain it in aligned relationship against shafts 42 and 34 while a thrust washer 100 assists in maintaining shaft 42 and gear hub 67 on shaft 34 in spaced axial alignment. Preferably, the space between members 28 and 30 below passage 43 and the space between the outer periphery of member 30 and the inner periphery of housing 12 are charged with a suitable lubricant such as glycerol. Sealing ring 161 isolates discharge chamber 17 from the interior of housing 12 to prevent seepage of the lubricant into chamber 17.

The homogenized fluid mass of swollen collagen fibrils prepared as described above, is fed under pressure by suitable pumps (not shown) to extruder 10 through a feed line 162. The collagen mass from feed line 162 is pumped through an interconnecting bore 164 formed in bottom 16 and aligned opening 166 in mandrel 18 into an elongated axially extending annular passage 168.

To form passage 168, a sleeve 170 is disposed concentrically within mandrel 18. The inner wall of mandrel 18 in the vicinity of sleeve 170 is recessed as at 172. The lower end of annular passage 168 is sealed by sealing ring 174 to isolate passage 168 from the interior of sleeve 170.

The collagen mass entering passage 168 travels upwardly therein. Near the upper end of its passage, the collagen mass passes through a plurality of radially spaced outlet ports 176 in mandrel 18 into an annular receiving chamber 178. Chamber 178 is formed by the radial offset 88 of shaft 34 and is defined by the outer cylindrical surface of stationary mandrel 18, the inner cylindrical surface of movable shaft 34, the underface of disc 32 and the upper face of ridge 88. Opposed annular sealing rings 179 isolate the upper and lower extremities of chamber 178 to prevent contamination of the collagen mass by the extruder lubricant. From chamber 178, the collagenous mass is fed through a second group of spaced radial ports 180 formed in shaft 34 which provide restricted communication with annular distributing chamber 43.

An initial mixing of the collagen fibrils is accomplished as the collagen is fed through ports 180 since these ports 180 formed in shaft 34 are normally rotating during the collagen feed.

The fluid collagen mass in chamber 43 is subjected to a second preliminary mixing or blending since the members defining chamber 43 are being rotated in opposite directions. From chamber 43, the collagen mass is travelled into the laterally-extending planar mixing chamber 51. In chamber 51, a thorough homogenization is effected by the action of the oppositely-rotating generally planar surfaces 52 and 54. Surfaces 52 and 54 break up or disperse any collagen fibril agglomerates in the fluid mass. These agglomerates or accumulations of collagen fibrils sometimes occur in the swollen collagen mass despite the filtering steps in the preparation of the extrusion material. Swollen collagen fibrils possess generally rubber-like elasticity. The swollen collagen fibril agglomerates are able to adapt themselves to the filter openings, becoming attenuated to fit through the filter and resuming their agglomerate condition once they have passed through the filter constrictions.

To disperse these agglomerates into their individual swollen fibril components, the invention applies a direct dispersing force thereto. Surfaces 52 and 54 impart a shearing action to the collagen mass moving through chamber 51. This shearing action applies the dispersing force to the collagen mass and tends to break up or disperse the collagen fibril agglomerates in the mass. The shearing action of surfaces 52 and 54 is generally transverse to the direction of movement of the collagen mass which is travelled radially outwardly in chamber 50.

At the periphery of disc 32, the fluid mass in chamber 50 passes around edge 58 into extrusion passage 50. In passage 50, the homogenization of the fluid fibrillar collagen mass is completed by the oppositely rotating planar faces 44 and 48 defining passage 50. Faces 44 and 48 impart a second transverse shearing action to the collagen mass moving radially inwardly of disc 32 toward discharge chamber 17. This second transverse shearing action ensures that any remaining collagen fibril agglomerates are dispersed before discharge of the collagen mass in tubular form.

As previously noted, upper passage 50 is narrower or shallower than lower chamber 51. Thus in passage 50, substantially the entire collagen mass is affected by one or the other of faces 44 and 48 forming pasage 50. By imparting a transverse shearing action to the entire depth of the collagen mass in passage 50, substantially all remaining collagen agglomerates are subjected to this shearing action and are eliminated from the mass prior to discharge.

The swollen collagen mass in passage 50 is travelled radially inwardly between rotating faces 44 and 48 into aligned planar section 23 of stationary discharge chamber 17 whence it is extruded upwardly through longitudinal annular section 21 thereof in the form of a continuous tube into a recirculating dehydrating bath.

The dehydrating or coagulating bath is recirculated in an enclosed system which includes a cylindrical distributor element 182 which surrounds recess 15 in cap 14 adjacent the discharge chamber 17. A vertical column 184 is supported on distributor 182 with the interior of the column 184 in communication with distributor 182. The coagulating liquid enters distributor 182 through conduit 186 and an aligned bore 188 in the wall of distributor 182 and hence into column 184 where it flows vertically upward against the outside of the extruded tubing.

The coagulating liquid is also supplied to the inside of the extruded tubing through another conduit 190 which communicates with the interior of mandrel 18. The portion of the liquid entering from the conduit 190 flows upwardly inside the mandrel into contact with the inner wall of the extruded tubing but at a considerably slower rate of flow than that of the liquid flowing along the exterior of the tubing, thereby to protect the walls thereof from disruption and undue liquid friction. The portion of the liquid inside the tubing is returned through overflow tube 192 axially disposed within mandrel 18 and extending upwardly to the tip of column 184. The portion of the liquid entering column 184 through distributor 182 and in contact with the outer periphery of the extruded casing is discharged at the top of the column 184 into a reservoir (not shown).

Inasmuch as the density of the extruded tubular body is substantially less than that of the coagulating liquid (e.g., a solution of 40% ammonium sulfate) the tubular body tends to float upwardly in the coagulating baths, thereby reducing the amount of pull required to move it to subsequent conditioning treatments.

Another advantage achieved by use of extruder 10 (as well as by the other forms of extruder shown herein) is the beneficial utilization of the visco-elastic characteristics of the fluid fibrillar mass of swollen collagen to reduce the extrusion pressures required. The amount of circular tension developed in such a mass is directly proportional to the length of time the material is subjected to the rotational forces applied and to the amount of material rotated.

In chamber 51, the tendency of the visco-elastic collagen mass to travel centripetally under circular tension must be overcome because said mass is being travelled radially outwardly under hydraulic feed pressure while rotated by members 28 and 38. However, the visco-elastic phenomenon is extremely advantageous when the mass reaches passage 50, which, as shown, is longer and shallower than chamber 51, so that substantially the entire collagen mass therein is affected by rotation of either one or the other of faces 44, 48. Therefore, in moving through passage 50, the collagen mass undergoes a more complete application of the rotary forces and therefore a greater amount of circular tension is developed therein. Thus, the counter-flow effect of circular tension developed in the collagen mass as it travels radially outwardly through chamber 51 is more than compensated by the desired centripetal flow thereof under the greater circular tension developed in passage 50.

To illustrate this in practice, with elements 28 and 30 rotating at 100–125 r.p.m. in opposite directions during the swollen collagen feed, a hydraulic feed pressure of 40–50 p.s.i. is required to extrude continuously twenty-five feet of tubing per minute, while with elements 28 and 30 stopped, a pressure of 70–90 p.s.i. is needed to continuously extrude twenty-five feet of casing per minute. The lower extrusion pressures are the result of utilizing the visco-elastic properties of the plastic collagen mass to assist in extruding the mass in continuous tubular form.

Figure 2:
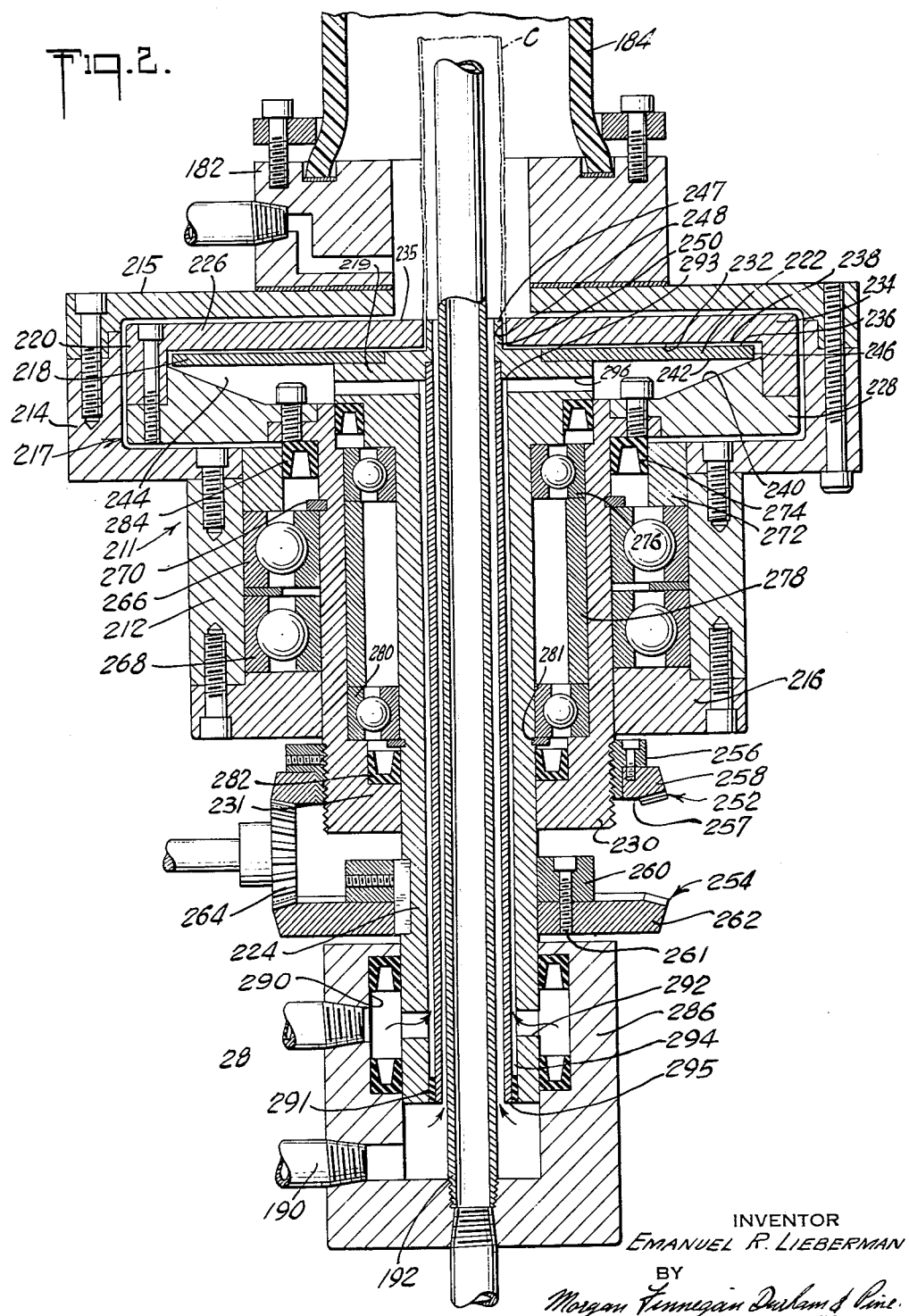
FIG. 2 is a vertical sectional view, similar to FIG. 1, of a second embodiment of the present invention.
Figure 3:
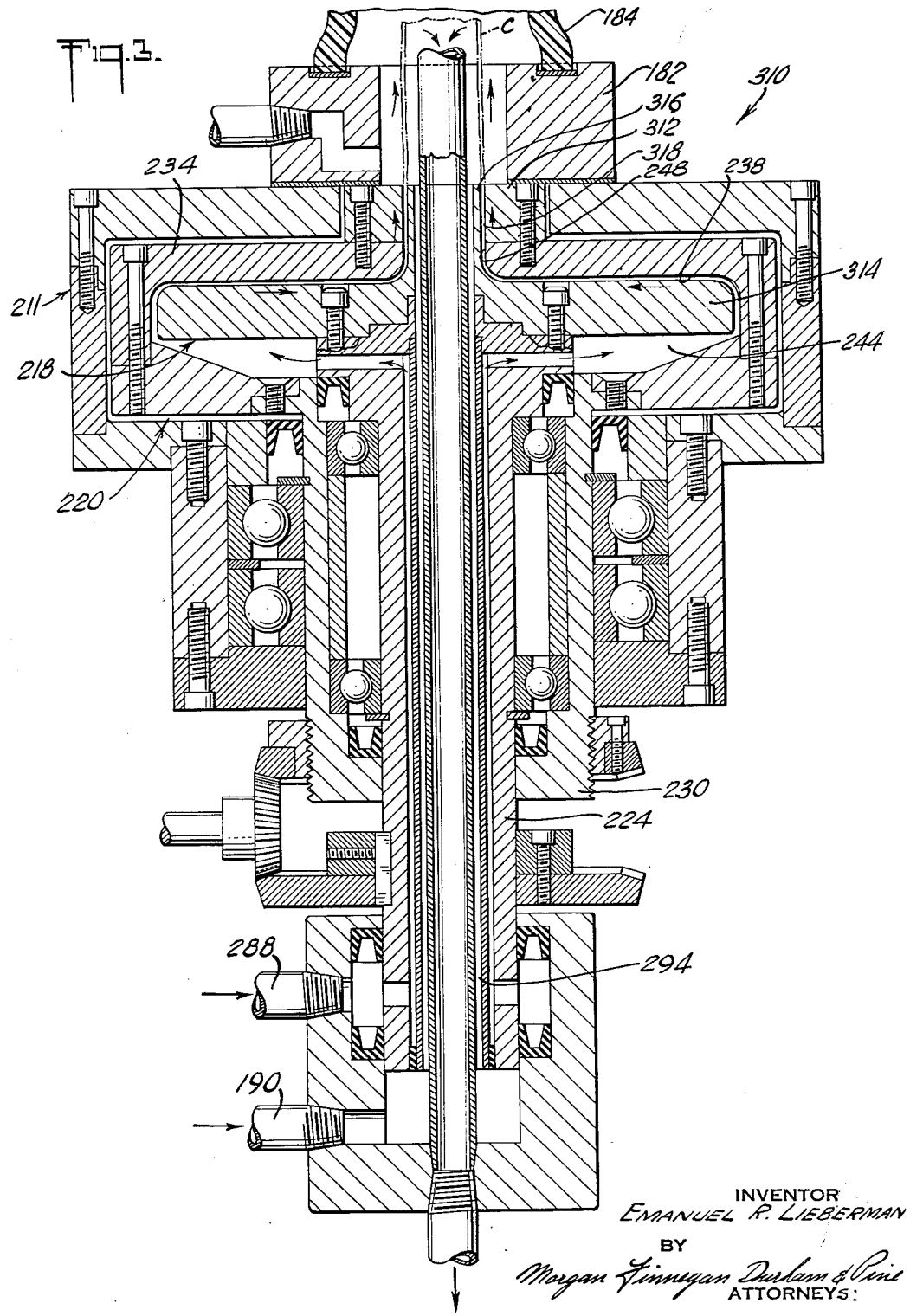
FIG. 3 is a vertical sectional view, similar to FIG. 1, of a third embodiment of the invention.

It will be understood that like numerals designate parts of like construction and operation in FIGS. 1, 2 and 3.

FIG. 2 discloses a modified form of extruder wherein means are provided for extruding the fluid collagen mass in tubular form through a short annular discharge or orifice chamber formed of oppositely rotating chamber walls, rather than through a stationary orifice chamber as in FIG. 1. In this embodiment, extruder 210 includes an outer housing 211 formed of a cylindrical section 212, an annular flange section 214 of generally L-shaped cross-section and an annular bottom flange section 216. An annular cap 215 is fixed on annular flange section 214 enclosing the upper section of housing 211.

Extruder 210 includes a collagen fibril distributing device, designated generally 217, co-axially disposed in housing 211. Device 217 includes a pair of spaced concentrically disposed relatively rotatable members 218 and 220 mounted for rotation about the central axis of the extruder. The innermost member 218 includes a flat disc-like upper section 222 fixed to and extending laterally of an annular flange 219 formed on the upper end of a tubular drive shaft 224. The outermost member 220 is formed of an inverted cylindrical section 226 secured to an annular transverse flange or lip 228 formed on the upper end of a second tubular drive shaft 230.

The planar inner face 232 of the base portion 234 of section 226 is mounted in adjacent spaced relation with respect to the upper face 236 of disc section 222 to define a generally planar radial extrusion passage 238 therebetween. In addition, the upper face 240 of lip 228 is partially inclined and forms with the underface 242 of disc 222 an inverted, semi-frusto-conical, annular mixing chamber 244. Chamber 244 interconnects with extrusion passage 238 around the circumferential edge 246 of disc 222 to form a smooth and continuous fluid path from the outer periphery of tubular drive shaft 224.

Element 218 is provided at its uppermost end with a relatively short, annular lip 247, at the center of disc 222 which extends through an accommodating central recess 248 in the base portion 234 of element 220. Lip 247 is co-terminous with the upper face 235 of base 234. Lip 247 may be formed integrally with shaft 224 or may be separately formed and suitably fixed on disc 222 or shaft 224. The periphery of central recess 248 is spaced from the outer cylindrical surface of lip 247 to form an annular discharge chamber 250 interconnected at its lower end to planar extrusion passage 238 and forming a transverse annular continuation thereof.

Drive shafts 224 and 230 are concentrically disposed in axial spaced relation in housing 211, as shown in FIG. 2. The shafts pass through bottom section 216 and are provided adjacent their lower ends with beveled gear assemblies 252 and 254, respectively. Gear assembly 252 includes an annular gear hub 256 threaded on the outer cylindrical surface of shaft 224 with a bevel gear 258 fixed to gear hub 256 by bolts 257. Gear assembly 254, in turn, comprises a gear hub 260 keyed in position on the outer cylindrical face of shaft 230 at a distance above the lowermost end of the shaft. A bevel gear 262 is secured to gear hub 260 by bolts 261. The bevels of gears 258 and 262 are oppositely disposed from engagement by a common pinion 264. The rotation of pinion 264 rotates shafts 234 and 230, and, consequently, members 218 and 220 in opposite directions. Pinion 264 is similar in construction and operation to pinion 64 of the previously described embodiment.

The lower end of shaft 234 passes through an accommodating passage in bottom portion 231 of shaft 230, and shafts 224 and 230 are held in spaced radial and axial alignment in housing 211 as follows:

A pair of spaced bearings 266 and 268 are disposed between the outer cylindrical periphery of shaft 230 and the inner cylindrical periphery of section 212. Lowermost bearing 268 rests on bottom section 216 and the bearings are locked in position by the outer periphery of shaft 230 by snap ring 270 on the outer periphery of shaft 230. Spacer ring 272 and sealing ring 274 isolate the interior of the bearings 266 and 268 to permit lubrication of the bearing assembly without the possibility of contaminating the rest of the extruder.

The underface of flange 219 rests on a bearing 276 disposed between shaft 224 and 230. Bearing 276, in turn, rests on a sleeve 278 supported on a second bearing 280 seated on bottom 231 of shaft 230 and disposed between shafts 224 and 230. Snap ring 281 on the outer periphery of shaft 224 assists in supporting bearing 280. Spaced annular sealing rings 282 and 284 isolate the interior of the bearings 276 and 280 to permit lubrication of the bearing assembly.

The lowermost end of inner shaft 224 is uncapped and disposed in the upper end of open housing 286. Shaft 224 fits snugly into housing 286, enclosing the upper end thereof.

In operation, a homogenized mass of swollen collagen fibrils is prepared as described for the previous embodiments. Said mass is fed under pressure by a feed line (not shown) through a bore 288 in the cylindrical wall of housing 286 and into a sealed, annular recess 290 formed in the inner cylindrical wall of the housing. From recess 290, the mass is fed through spaced radial ports 292 in the lower end of shaft 224 into an elongated, axially extending, annular passage 294.

To form passage 294, a sleeve 295 is disposed concentrically within shaft 224. The inner wall of the shaft is recessed in the vicinity of the sleeve 295, as at 293, and the sleeve fixed thereto. A sealing ring 291 seals the lower end of passage 294, isolating the passage from the interior of the sleeve 295.

The fluid mass in passage 294 is travelled longitudinally upwardly through rotating shaft 224. Near the upper end of its passage, the mass passes through a plurality of spaced radial bores 296 in the upper end of shaft 224 which provide restricted communication with the annular mixing chamber 244.

As in the previous embodiment, the fluid mass of swollen collagen fibrils is travelled radially outwardly in chamber 244 between the counter-rotating elements 218 and 220. At the periphery of disc 222, the mass passes around edge 246 thereof into the narrow, planar, extrusion passage 238. The mass is again subjected to the action of the counter-rotating elements 218 and 220 as it moves radially inward through passage 238 toward the transverse, annular discharge chamber 250 formed by lip 247 and base 234 of element 220, which are rotating in opposite directions. The mass in chamber 250 is extruded therefrom in continuous tubular form through an accommodating opening 298 into a recirculating dehydrating bath.

FIG. 3 discloses another modified form of the invention. In this embodiment, the casing is extruded through an annular discharge chamber formed by oppositely rotating wall members which is substantially longer than that shown in FIG. 2.

In most respects, the extruder 310 of the present modification is similar in construction and operation to extruder 210 disclosed in FIG. 2. However, in this modification base 234 is provided with an annular, longitudinally extending wall 312 at the periphery of central recess 248. Disc 222 of FIG. 2 is replaced by disc 314 which is similar in construction and operation to disc 222 but is of substantially greater thickness to more easily withstand the extrusion pressures. Disc 314 includes an elongated, central, annular lip 316 which cooperates with wall 312 to form an elongated annular discharge chamber 318 therebetween. Wall 312 and lip 316 are co-terminous with the upper end of housing 211. Chamber 318 is disposed generally transverse to extrusion passage 320 formed by base 234 and disc 319, but communicates therewith at its lower end. Passage 320 is similar to passage 238 of FIG. 2.

The mass of swollen collagen fibrils, prepared as in the previous embodiments, is fed under pressure through interconnected passage 294, chamber 244 and extrusion passage 320. Shafts 224 and 230 are rotated in opposite directions to effect the uniform distribution of the collagen fibrils as in the previous embodiments. The collagen mass in extrusion passage 320 is extruded through elongated, annular discharge chamber 318 as a tubular body into the recirculating dehydrating bath thereabove. In this embodiment, the collagen fibrils are extruded through an elongated annular discharge chamber 318 formed by the oppositely rotating members 312 and 316.

The casing tubing produced in accordance with any embodiment of the present invention may be coagulated, hardened, dried, shirred and linked to form a readily cookable and edible sausage product.

While the invention has been described in detail according to the preferred manner of carrying out the method and the devices embodying the invention, it will be obvious to those skilled in the art, after understanding the invention, that changes and modifications may be made therein without departing from the spirit or scope of the invention, and it is intended in the appended claims to cover such changes and modifications.

What is claimed is:

1. The method of extruding a tubular body containing collagen which comprises feeding under pressure a cool fluid mass of swollen collagen fibrils having a collagen solids content between 2.5% and 6% by weight into a passageway between opposed planar surfaces said passageways being substantially greater in length than depth, rotating said surfaces relative to each other to impart shearing forces to said mass and then extruding said mass as a tubular body with the inner and outer walls of said tube being formed from the respective portions of said mass moving contiguous to and manipulated by said surfaces.

2. The method of extruding a tubular body containing collagen which comprises feeding under pressure a cool fluid mass of swollen collagen fibrils having a collagen solids content between 2.5% and 6% by weight into a passageway between opposed planar surfaces, rotating said surfaces in opposite directions to impart equal but opposite shearing forces to said mass and then extruding said mass as a tubular body with the inner and outer walls of said tube being formed from the respective portions of said mass moving contiguous to and manipulated by said surfaces.

3. The method of extruding a tubular body containing collagen which comprises feeding under pressure a cool fluid mass of swollen collagen fibrils content between 2.5% and 6% by weight into and through a pair of interconnected continuous superposed passages between opposed planar surfaces, rotating said surfaces relative to each other to impart shearing forces to said mass as it is travelled through said passages, and extruding said mass as a tubular body with the inner and outer walls of said tube being formed from the respective portions of said mass moving contiguous to and manipulated by said surfaces.

4. An extruder for forming a tubular body in a fluid mass of swollen collagen fibrils having a collagen solids content above about 2.5% and below about 6% including in combination:
a disc rotatable about the central axis of the extruder;
a planar surface below and spaced from the lower surface of the disc to form a smooth and continuous radial first passageway for flow of said fluid between said surfaces;
a second planar surface above and spaced from the upper surface of said disc to form a second passageway for flow of said fluid therebetween;
means for moving said fluid mass through said first passageway and in a reverse direction through said second passageway;
means for rotating said disc to effect relative rotational movement of said surfaces to impart a shearing force to said fluid mass therebetween;
and a tubular discharge orifice communicating with said second passageway.

5. An extruder for forming a tubular body from a fluid mass of swollen collagen fibrils having a collagen solids content above 2.5% comprising in combination:
a disc;
means mounting said disc for rotation about the central axis of the extruder;
a planar surface below and spaced from the lower surface of the disc to form a smooth and continuous radial first passageway for flow of said fluid therebetween;
a second planar surface above and spaced from the upper surface of said disc to form a second passageway for flow of said fluid therebetween;
said first and second passageways communicating around the perimeter of said disc to form a continuous path of travel for said fluid mass between said surfaces;
said passageways being of substantially greater length than depth;
means for moving said fluid mass through said lower and upper passageways;
means for rotating said disc to effect relative rotational movement of said surfaces to impart a shearing force to said fluid mass therebetween;
and a tubular discharge orifice communicating with said upper passageway.

6. An extruder for forming a tubular body of swollen collagen fibrils having a collagen solids content of between 2.5% and 6% including in combination:
a disc having generally flat upper and lower surfaces;
a tubular shaft supporting said disc for rotation about the central axis of the extruder;
a smooth planar surface below and spaced from the lower surface of said disc to form a smooth first radial passage for flow of said fluid;
a second smooth planar surface above and spaced with the upper surface of said disc to form a second smooth planar passage for flow of said fluid therebetween;
said first and second passages communicating around the perimeter of said disc to form a smooth, continuous path of travel for said fluid mass between said surfaces;
means interconnecting said planar surfaces forming a housing for said disc to enclose said path of travel of said fluid mass;
an elongated, annular delivery chamber axially disposed in said tubular shaft;
means communicating said delivery chamber and said first planar passage;
means for flowing said fluid mass axially through said delivery chamber and outwardly of said disc through said first passage and inwardly of said disc through said second passage;
means for rotating said tubular shaft to effect relative rotational movement of said surfaces to impart a shearing force to said fluid mass therebetween;
and a central tubular discharge orifice communicating with said second passage.

7. An extruder for forming a tubular body of swollen collagen fibrils having a collagen solids content of between 2.5% and 6% including in combination:
a disc having generally flat upper and lower surfaces;
a tubular shaft supporting said disc for rotation about the central axis of the extruder;
a planar surface below and spaced from the lower surface of said disc to form a first passage for radial flow of said fluid;
a second planar surface above and in adjacent spaced relationship with the upper surface of said disc to form a second planar passage for flow of said fluid therebetween;
said second passage being of smaller depth than said first passage and said passages being of substantially greater length than depth;
said first and second passages communicating around the perimeter of said disc to form a smooth, continuous path of travel for said fluid mass;
means interconnecting said planar surfaces and forming a housing for said disc to enclose said path of travel of said fluid mass;
an elongated, annular delivery chamber axially disposed in said tubular shaft;
means mounting said planar surfaces for rotation concentric with said disc but in the opposite direction;
means communicating said delivery chamber and said first planar passage;
means for flowing said fluid mass axially through said delivery chamber and outwardly of said disc through said first passage and inwardly of said disc through said second passage;
means for rotating said planar surfaces and said tubular shaft in opposite directions to impart a shearing force to said fluid mass therebetween;
and a central tubular discharge orifice communicating with said second passage.

8. An extruder for forming a tubular body of collagen having a collagen solids content of between 2.5% and 6% including in combination:
a disc having generally flat upper and lower surfaces;

a tubular shaft supporting said disc for rotation about the central axis of the extruder;
a planar surface below and spaced from the lower surface of said disc to form a first passage for flow of said fluid;
a second planar surface above and spaced from the upper surface of said disc to form a second planar passage for flow of said fluid therebetween;
said first and second passages communicating around the perimeter of said disc to form a continuous path of travel for said fluid mass between said surfaces;
a hollow cylindrical mandrel;
means securing said mandrel in position axially inside said tubular shaft;
an elongated annular delivery chamber formed in said mandrel;
a plurality of cooperating radial bores through the cylindrical walls of said mandrel and said cylindrical shaft, said bores communicating said delivery chamber with said first planar passage;
an outer housing for said extruder;
means for mounting said planar surfaces for concentric rotation with said disc, but in the opposite direction thereto;
means for flowing said fluid mass axially through said delivery chamber and outwardly of said disc through said first passage and inwardly of said disc through said second passage;
means for rotating said tubular shaft and said planar surfaces to impart a shearing force to said fluid mass therebetween;
a central tubular discharge orifice communicating with said second planar surface and forming a transverse continuation thereof, said orifice including a central circular opening in said outer housing;
and an extension on said mandrel extending axially through said disc and said upper planar surface and concentrically disposed in said housing in spaced relation with the periphery of said opening to define a stationary discharge orifice.

9. An extruder for forming a tubular body from a mass of collagen fibrils which comprises:
a housing;
a disc rotatable about an axis within said housing;
means including one surface of said disc constituting a first radial passageway through which the material to be extruded may flow outwardly;
means including the other surface of said disc constituting a second radial passageway through which said material may flow inwardly;
a passageway interconnecting said radial passageways; and
a tubular discharge orifice communicating with said second passageway;
said disc, upon rotation, being adapted to impart shearing forces to the material traversing said passageways.

10. The method of extruding a tubular body from a fluid mass of swollen collagen fibrils having a collagen solids content of at least 2.5% and below 6% by weight which comprises feeding said fluid mass under pressure to a tubular extrusion orifice and eliminating boundary effects in said collagen mass by imparting transverse, rotary while flowing said collagen mass in closed arcuate paths to said extrusion orifice shearing forces to said mass during the extrusion process.

11. The method of extruding a tubular body from a fluid mass of swollen collagen fibrils having a collagen solids content between 2.5% and 6% by weight which comprises feeding said fluid mass to a tubular extrusion orifice, eliminating boundary effects in said collagen mass by imparting transverse rotary equal but opposed shearing forces to said mass during the extrusion process and preventing development of boundary effects in said mass during extrusion by flowing said collagen mass in continuous curved paths to said extrusion orifice.

12. The method of extruding a tubular body from a fluid mass of swollen collagen fibrils which comprises feeding said fluid mass under pressure toward a tubular extrusion orifice and obliterating the formation of boundary surfaces in said mass by moving said mass continuously in closed circular paths while subjecting it to transverse rotary shearing forces.

References Cited in the file of this patent

UNITED STATES PATENTS

| 2,161,908 | Becker | June 13, 1939 |
| 2,337,775 | Schultz | Dec. 28, 1943 |
| 2,896,254 | Braun | July 28, 1959 |
| 2,977,632 | Bunch | Apr. 4, 1961 |

FOREIGN PATENTS

| 672,035 | Germany | Feb. 18, 1939 |
| 104,023 | Sweden | Mar. 17, 1942 |
| 522,586 | Canada | Mar. 13, 1956 |

OTHER REFERENCES

Maxwell and Scalora: The Elastic Melt Extruder-Work Without Screw, in Plastics Engineering pages 107–210, October 1959.

UNITED STATES PATENT OFFICE
CERTIFICATE OF CORRECTION

Patent No. 3,122,788                          March 3, 1964

Emanuel Roy Lieberman

It is hereby certified that error appears in the above numbered patent requiring correction and that the said Letters Patent should read as corrected below.

Column 9, line 18, for "14" read -- 114 --; column 10, line 29, for "thorugh" read -- through --; column 20, lines 13 to 16, strike out "rotary while flowing said collagen mass in closed arcuate paths to said extrusion orifice shearing forces to said mass during the extrusion process." and insert instead -- rotary, shearing forces to said mass during the extrusion process, while flowing said collagen mass in closed arcuate paths to said extrusion orifice. --.

Signed and sealed this 29th day of December 1964.

(SEAL)
Attest:

ERNEST W. SWIDER                                    EDWARD J. BRENNER
Attesting Officer                                          Commissioner of Patents